(12) United States Patent
Cho et al.

(10) Patent No.: US 9,735,432 B2
(45) Date of Patent: Aug. 15, 2017

(54) METHOD FOR FABRICATING CORE-SHELL PARTICLES SUPPORTED ON CARRIER AND CORE-SHELL PARTICLES SUPPORTED ON CARRIER FABRICATED BY THE SAME

(71) Applicant: LG CHEM, LTD., Seoul (KR)

(72) Inventors: Jun Yeon Cho, Daejeon (KR); Sang Hoon Kim, Daejeon (KR); Gyo Hyun Hwang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 162 days.

(21) Appl. No.: 14/383,049

(22) PCT Filed: Apr. 22, 2013

(86) PCT No.: PCT/KR2013/003410
§ 371 (c)(1),
(2) Date: Jul. 31, 2015

(87) PCT Pub. No.: WO2013/168912
PCT Pub. Date: Nov. 14, 2013

(65) Prior Publication Data
US 2015/0333336 A1 Nov. 19, 2015

(30) Foreign Application Priority Data

May 11, 2012 (KR) ........................ 10-2012-0050491

(51) Int. Cl.

| | |
|---|---|
| *H01M 4/86* | (2006.01) |
| *H01M 4/88* | (2006.01) |
| *H01M 4/92* | (2006.01) |
| *B01J 37/16* | (2006.01) |
| *B01J 23/89* | (2006.01) |
| *B01J 35/00* | (2006.01) |
| *B82Y 30/00* | (2011.01) |
| *B82Y 40/00* | (2011.01) |
| *B01J 37/02* | (2006.01) |

(52) U.S. Cl.
CPC ......... *H01M 4/8657* (2013.01); *B01J 23/892* (2013.01); *B01J 35/008* (2013.01); *B01J 35/0013* (2013.01); *B01J 37/16* (2013.01); *H01M 4/8825* (2013.01); *H01M 4/92* (2013.01); *H01M 4/925* (2013.01); *B01J 35/0033* (2013.01); *B01J 37/0244* (2013.01); *B82Y 30/00* (2013.01); *B82Y 40/00* (2013.01); *Y10S 977/777* (2013.01); *Y10S 977/81* (2013.01); *Y10S 977/892* (2013.01); *Y10S 977/896* (2013.01); *Y10S 977/948* (2013.01)

(58) Field of Classification Search
None
See application file for complete search history.

(56) References Cited

U.S. PATENT DOCUMENTS

| | | |
|---|---|---|
| 2009/0117257 A1 | 5/2009 | Monnier et al. |
| 2012/0010069 A1 | 1/2012 | Takehiro et al. |
| 2012/0321996 A1 | 12/2012 | Ito |

FOREIGN PATENT DOCUMENTS

| | | |
|---|---|---|
| CN | 102088091 A | 6/2011 |
| CN | 102268045 * | 12/2011 |
| JP | 2004-131781 A | 4/2004 |
| JP | 2010-214330 A | 9/2010 |
| JP | 2011-212666 A | 10/2011 |
| JP | 2011-218278 A | 11/2011 |
| JP | 2012-16684 A | 1/2012 |
| JP | 2013-215697 A | 10/2013 |
| WO | 2011-108162 A1 | 9/2011 |

OTHER PUBLICATIONS

J. Phys. Chem. B, vol. 108, 11611-11619.

* cited by examiner

*Primary Examiner* — Ladan Mohaddes
(74) *Attorney, Agent, or Firm* — Dentons US LLP

(57) ABSTRACT

The present invention provides a method for fabricating core-shell particles supported on a carrier, the method including: forming a solution by adding a first metal supported on a carrier to a solvent; adjusting a pH of the solution from 7 to 14 and adding a metal salt of a second metal thereto; and forming core-shell particles by adding a reducing agent to the solution and forming a shell including the second metal on a surface of a core particle including the first metal, and core-shell particles fabricated by the method.

8 Claims, 7 Drawing Sheets

[Figure 1]
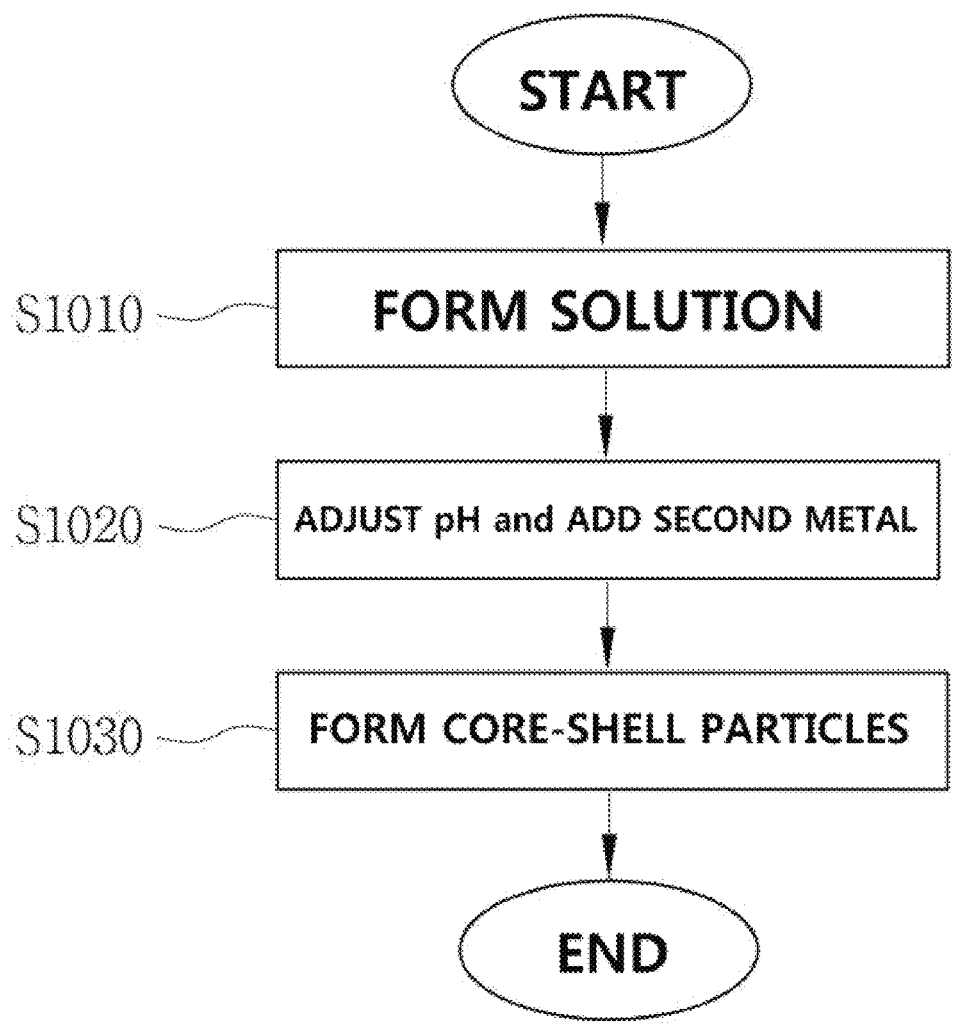

[Figure 2]
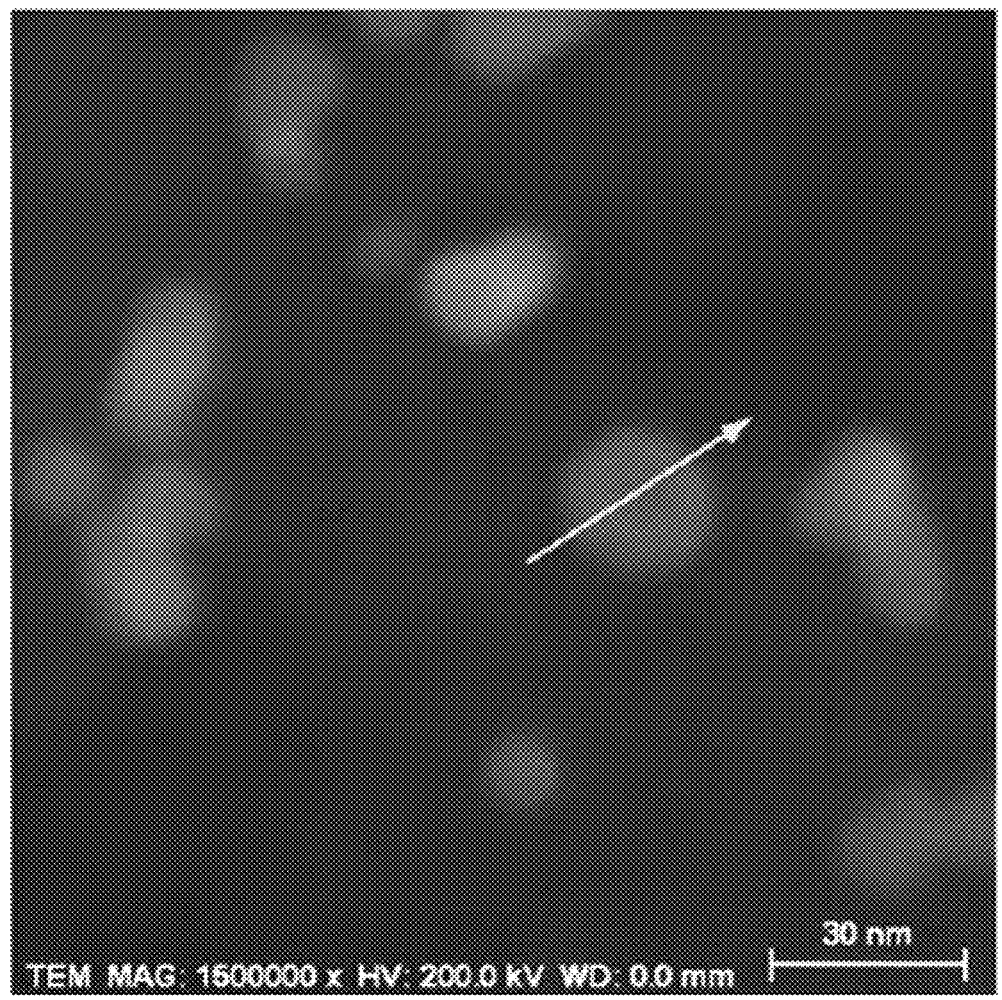

[Figure 3]
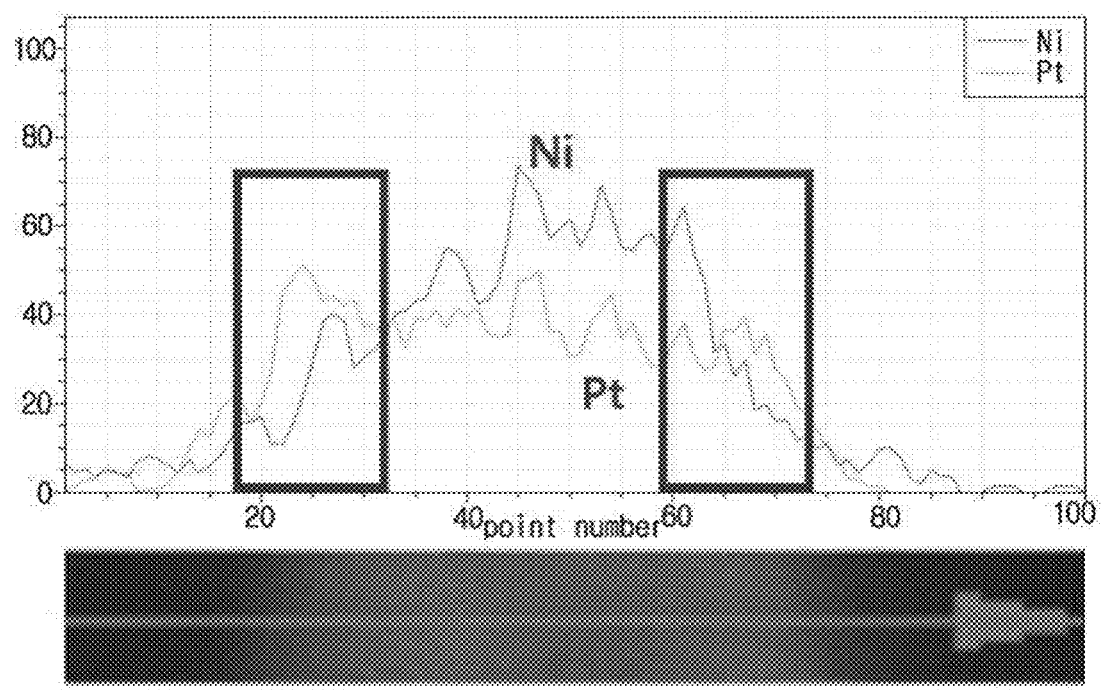

[Figure 4]
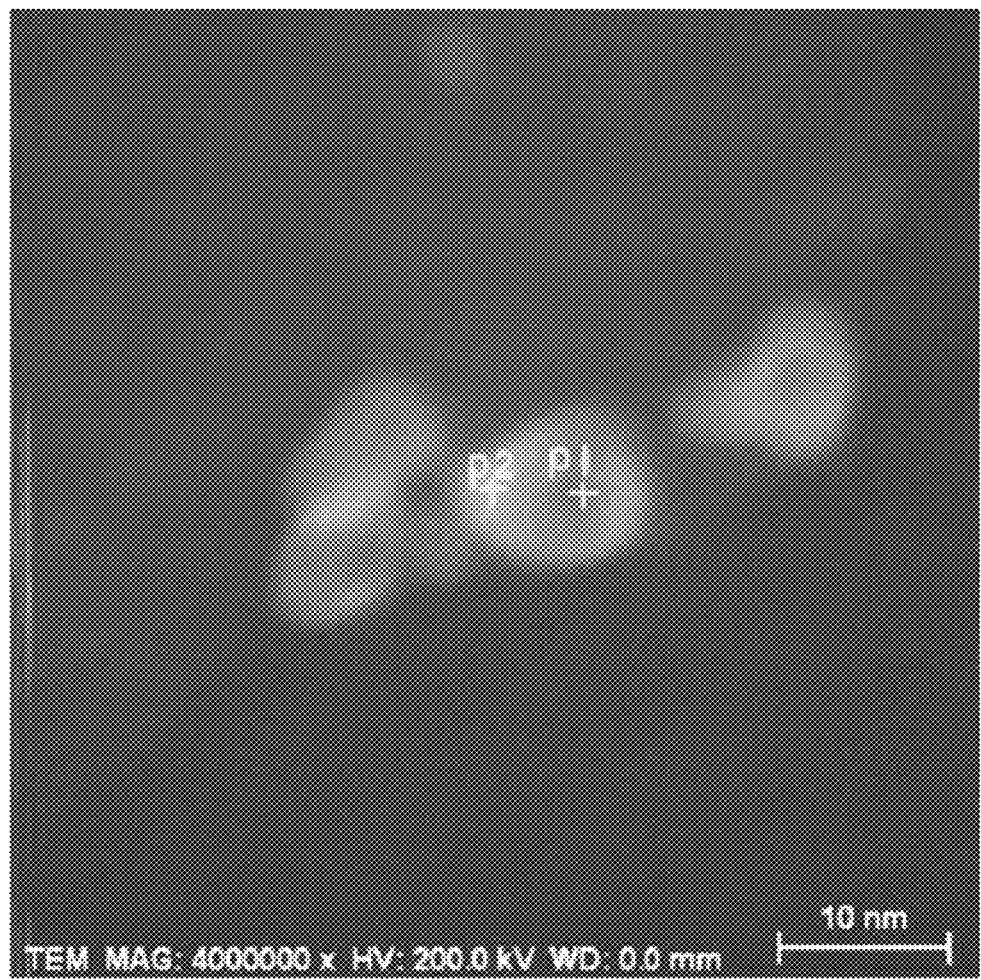

[Figure 5]
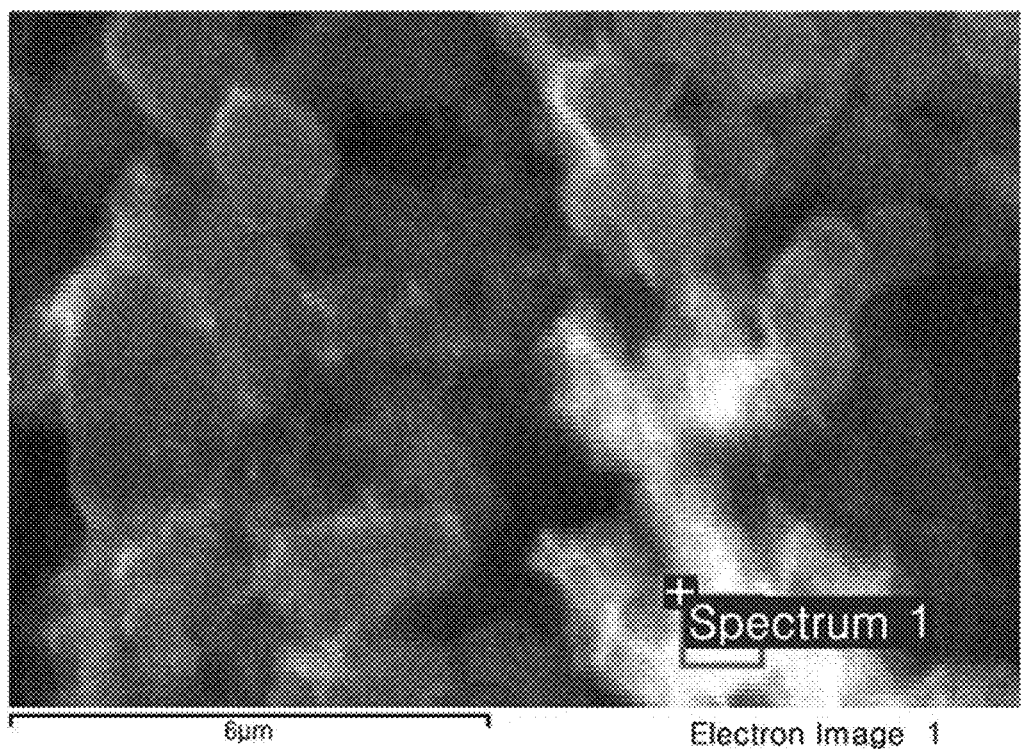
[Figure 6]
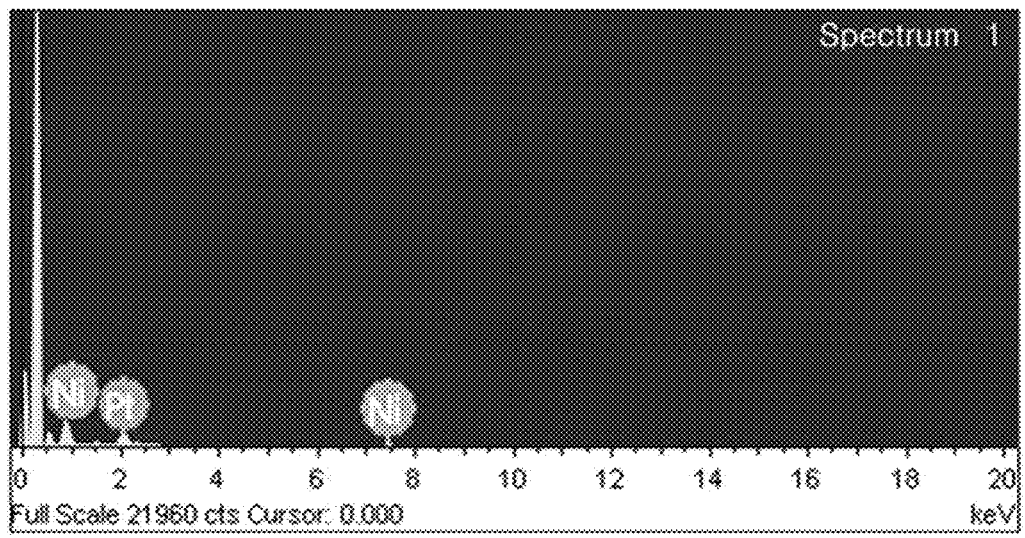

[Figure 7]
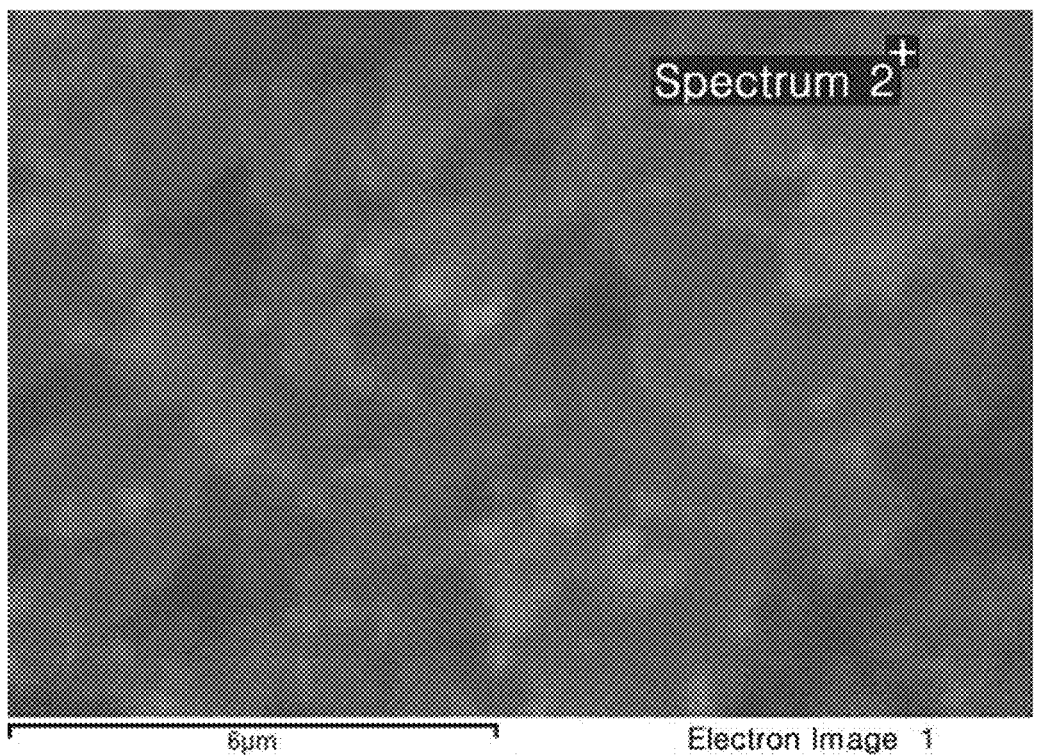
[Figure 8]
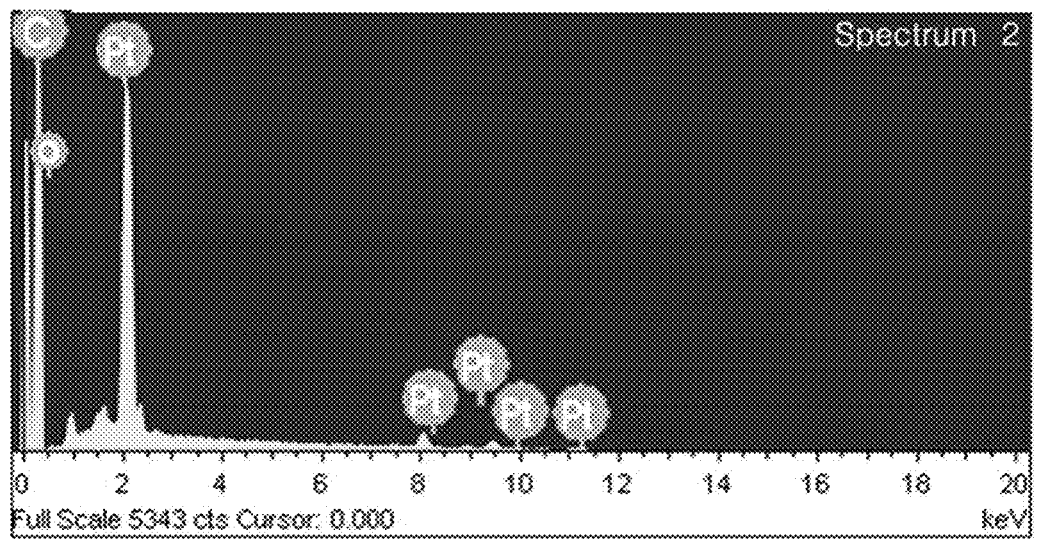

FIG. 9

TABLE 1

| Spectrum: p 1 | | | | | |
|---|---|---|---|---|---|
| El AN | Series | unn. C [wt.%] | norm. C [wt.%] | Atom. C [at.%] | Error [wt.%] |
| Ni 28 | K-series | 55.93 | 55.93 | 80.84 | 2.8 |
| Pt 78 | L-series | 44.07 | 44.07 | 19.16 | 5.6 |
| | Total: | 100.00 | 100.00 | 100.00 | |

TABLE 2

| Spectrum: p 2 | | | | | |
|---|---|---|---|---|---|
| El AN | Series | unn. C [wt.%] | norm. C [wt.%] | Atom. C [at.%] | Error [wt.%] |
| Ni 28 | K-series | 19.88 | 19.88 | 45.20 | 0.9 |
| Pt 78 | L-series | 80.12 | 80.12 | 54.80 | 8.3 |
| | Total: | 100.00 | 100.00 | 100.00 | |

METHOD FOR FABRICATING CORE-SHELL PARTICLES SUPPORTED ON CARRIER AND CORE-SHELL PARTICLES SUPPORTED ON CARRIER FABRICATED BY THE SAME

CROSS-REFERENCE TO RELATED APPLICATIONS

This application is a National Stage Application of International Patent Application No. PCT/KR2013/003410, filed on Apr. 22, 2013, which claims the benefit of Korean Patent Application No. 10-2012-0050491, filed on May 11, 2012 in the Korean Intellectual Property Office, all of which are incorporated herein by reference in their entirety.

TECHNICAL FIELD

The present specification relates to a method of fabricating core-shell particles supported on a carrier and core-shell particles supported on a carrier fabricated by the method.

BACKGROUND ART

Nano particles are particles having a nano-scaled particle size, and exhibit optical, electric, and magnetic characteristics completely different from those of a bulk-state material due to a quantum confinement effect in which the energy required for electron transfer is changed depending on the size of material, and a large specific surface area. Thus, due to these properties, much interests have been focused on the applicability in the fields of catalysts, electro-magnetics, optics, medicine, and the like. Nano particles may be an intermediate between bulk and molecule, and in terms of an approach in two ways, that is, a "Top-down" approach and a "Bottom-up" approach, it is possible to synthesize nano particles.

Examples of a method for synthesizing metal nano particles include a method for reducing metal ions with a reducing agent in a solution, a method using gamma rays, an electrochemical method, and the like. However, methods in the related art are problematic in that it is difficult to synthesize nano particles having a uniform size and shape, or the use of an organic solvent leads to environmental pollution, high costs, and the like. For these various reasons, it was difficult to economically mass-produce high-quality nano particles.

As methods of fabricating nano particles in the related art, methods of reducing or thermally decomposing a metal acetylacetonate-based precursor or a metal carbonyl-based precursor in an organic solvent at high temperature by using an excessive amount of surfactant have been used. There is a problem in that a lot of costs are required since the metal acetylacetonate-based precursor is expensive, and that the metal carbonyl-based precursor is toxic.

SUMMARY OF THE INVENTION

The present invention has been made in an effort to provide a method for fabricating core-shell particles supported on a carrier, which do not cause environmental pollution during fabrication and may easily mass-produced at relatively low costs.

The present invention has been made in an effort to provide core-shell particles supported on a carrier fabricated by the fabrication method.

The present invention has been made in an effort to provide a catalyst for a fuel cell including core-shell particles supported on a carrier fabricated by the fabrication method and a fuel cell including the same.

The problems of the present invention to be solved are not limited to the aforementioned technical problems, and other technical problems, which are not mentioned, may be obviously understood by a person with ordinary skill in the art from the following description.

An exemplary embodiment of the present invention provides a method for fabricating core-shell particles supported on a carrier, the method including: forming a solution by adding a first metal supported on a carrier to a solvent; adjusting a pH of the solution from 7 to 14 and adding a metal salt of a second metal thereto; and forming core-shell particles by adding a reducing agent to the solution and forming a shell including the second metal on a surface of a core particle including the first metal.

Another exemplary embodiment of the present invention provides core-shell particles supported on a carrier fabricated by the fabrication method.

Yet another exemplary embodiment of the present invention provides a catalyst for a fuel cell including core-shell particles supported on a carrier fabricated by the fabrication method.

Still another exemplary embodiment of the present invention provides a fuel cell including the catalyst for a fuel cell.

According to the present invention, there is an advantage in that nano particles may be easily mass-produced at relatively low costs without causing environmental pollution. Further, there is an advantage in that nano particles may be produced without using a surfactant.

BRIEF DESCRIPTION OF THE DRAWINGS

FIG. 1 is a flowchart illustrating a method for fabricating core-shell particles according to an exemplary embodiment of the present invention.

FIG. 2 illustrates a high-resolution transmission electron microscope (HR-TEM) image of core-shell particles fabricated according to Example 1.

FIG. 3 illustrates a result of analyzing the content of elements positioned along the arrow line in the image of FIG. 2.

FIG. 4 illustrates a core point indicated as P1 and a shell point indicated as P2 in the HR-TEM image of the core-shell particles fabricated according to Example 1.

FIG. 5 illustrates a transmission electron microscope (TEM) image of Comparative Example 1.

FIG. 6 illustrates an element analysis result of a point indicated as Spectrum 1 in the image of FIG. 5.

FIG. 7 illustrates a transmission electron microscope (TEM) image of Comparative Example 2.

FIG. 8 illustrates an element analysis result of a point indicated as Spectrum 2 in the image of FIG. 7.

FIG. 9 provides Tables 1 and 2 that show the energy dispersive x-ray spectroscopy (EDS) analysis results of point P1 in the image of FIG. 4 and the P2 point in the image of FIG. 4, respectively.

DETAILED DESCRIPTION

The advantages and features of the present application, and methods of accomplishing the advantages and features will become obvious with reference to exemplary embodiments to be described below in detail along with the accompanying drawings. However, the present application is not limited to the exemplary embodiments to be disclosed below, but will be implemented in various forms different from each other. The exemplary embodiments are merely intended to make the disclosure of the present application complete and to completely notify the person with ordinary skill to which the present application pertains of the scope of the invention, and the present application is only defined by the scope of claims. The size and relative size of the constituent elements marked in the drawings may be exaggerated for clarity of description.

Unless otherwise defined, all terms including technical and scientific terms used in the present specification may be used as the meaning which may be commonly understood by the person with ordinary skill in the art to which the present application pertains. Terms defined in commonly used dictionaries should not be interpreted in an idealized or excessive sense unless clearly and particularly defined.

Hereinafter, referring to FIGS. 1 to 8, a method of fabricating core-shell particles according to an exemplary embodiment of the present invention will be described.

FIG. 1 is a flowchart illustrating a method for fabricating core-shell particles according to an exemplary embodiment of the present invention.

First, a solution is formed by adding a first metal supported on a carrier to a solvent (S1010).

In the exemplary embodiment of the present invention, the first metal may be selected from the group consisting of metals belonging to Groups 3 to 15 of the periodic table, metalloids, lanthanide metals, and actinide metals, and specifically, may be one selected from the group consisting of platinum (Pt), ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), gold (Au), cerium (Ce), silver (Ag), and copper (Cu). Specifically, the first metal may be selected from the group consisting of ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), cerium (Ce), silver (Ag), and copper (Cu). Even more specifically, the first metal may be nickel (Ni). The first metal may be different from a second metal.

In the exemplary embodiment of the present invention, the carrier is not limited as long as the carrier may support the first metal. Specifically, a carbon-based material or an inorganic fine particle may be used as the carrier. As the carbon-based material, it is possible to use one selected from the group consisting of carbon black, carbon nano tube (CNT), graphite, graphene, activated carbon, mesoporous carbon, carbon fiber, and carbon nano wire, and examples of the carbon black include denka black, ketjen black or acetylene black. As the inorganic fine particle, alumina, silica, titania, zirconia, and the like may be used, but in general, a carbon-based material may be used.

In the exemplary embodiment of the present invention, the method of supporting the first metal on a carrier uses a known typical method, and is not particularly limited.

According to the exemplary embodiment of the present invention, the solvent may be a solvent including water. Specifically, in the exemplary embodiment of the present invention, the solvent serves to dissolve first metal particles supported on the carrier, and may be water or a mixture of water and a $C_1$ to $C_6$ alcohol, more specifically, water.

In the exemplary embodiment of the present invention, the forming of the solution may be performed at room temperature. Specifically, the forming of the solution may be performed at a temperature in a range from 4° C. to 35° C., and more specifically at 15° C. to 28° C. When an organic solvent is used as the solvent, there is a problem in that fabrication needs to be performed at a high temperature exceeding 100° C. Since an interface of the core-shell particles fabricated is hydrophobic, the particles are aggregated with each other when the core-shell particles are immersed in water, and thus are not dispersed in water. Accordingly, since the core-shell particles may not be used while dispersed in water, there is a problem in that the application thereof is limited. However, the present invention uses water as the solvent, and thus is advantageous in that the solution may be formed at low temperature, specifically at room temperature. Accordingly, there is an advantage in that no environmental pollution is caused, and there is an effect of reducing costs because mass production may be achieved at low costs.

According to the exemplary embodiment of the present specification, a surfactant may not be used in the fabrication method.

Because water is used as the solvent and a surfactant is not used in the fabrication method, there is an advantage in that the fabrication method is also beneficial for mass production due to an effect of reducing costs, and there is an advantage in that the fabrication method is an environmentally-friendly process. When a surfactant is used, the surface of particles is surrounded by the surfactant, such that there is a problem in that it is not easy for reactants to approach the surfactant when the surfactant is used in a catalyst reaction, and thus a post-process of removing the surfactant is required. Accordingly, when the surfactant is not used, the process is simplified, and thus there is an effect of reducing costs and the process is also beneficial for mass production.

Subsequently, the pH of the solution is adjusted from 7 to 14, and a metal salt of a second metal is added (S1020).

In the exemplary embodiment of the present invention, the pH of the solution may be adjusted by adding a base solution. Specifically, the pH may be adjusted by adding a base solution selected from the group consisting of sodium hydroxide (NaOH), barium hydroxide ($Ba(OH)_2$), potassium oxide (KOH), calcium hydroxide ($Ca(OH)_2$), and lithium hydroxide (LiOH).

When the pH of the solution is adjusted to basicity from 7 to 14, the surface charge of a core carries negative charges such that the core may be easily bonded to a positive ion complex of the metal salt of the second metal, thereby forming a shell on the surface of the core. Specifically, according to the exemplary embodiment of the present specification, the pH of the solution may be adjusted to basicity from 10 to 12. More specifically, the pH of the solution may be adjusted to 11.

Conversely, when the pH of the solution is acidic from 1 to 7, the surface of the core carries positive charges and it is difficult for the core to be bonded to the positive ion complex of the metal salt of the second metal. In addition, the metal may be corroded in an acidic atmosphere, and thus there is a problem in that it is difficult to form core-shell particles.

In the exemplary embodiment of the present invention, the second metal may be selected from the group consisting of metals belonging to Groups 3 to 15 of the periodic table, metalloids, lanthanide metals, and actinide metals, and specifically, may be one selected from the group consisting of platinum (Pt), ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), gold (Au), cerium (Ce), silver (Ag), and copper (Cu). More specifically, the second metal may be selected from the group consisting of platinum (Pt), gold (Au), silver (Ag), and palladium (Pd), and even more specifically, may be platinum (Pt).

In the exemplary embodiment of the present invention, the metal salt of the second metal may be ionized into a positive ion complex. When the metal salt is ionized in an aqueous solution, the metal salt may carry positive charges when present in the form of a positive ion complex, and thus may be easily bonded to the surface of the core carrying negative charges.

In the exemplary embodiment of the present invention, the metal salt of the second metal may be specifically represented by the following Formula 1.

$$XAmBn \qquad \text{[Formula 1]}$$

In Formula 1,

X may be selected from the group consisting of metals belonging to Groups 3 to 15 of the periodic table, metalloids, lanthanide metals, and actinide metals, and specifically, may be selected from the group consisting of platinum (Pt), ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), gold (Au), cerium (Ce), silver (Ag), and copper (Cu). More specifically, X may be selected from the group consisting of platinum (Pt), gold (Au), silver (Ag), and palladium (Pd). X may be different from the first metal.

A may be ($NH_3$), ($CH_3NH_2$) or ($H_2O$).

B may be a monovalent anion, and specifically, may be selected from the group consisting of $NO_3^-$, $NO_2^-$, $OH^-$, $F^-$, $Cl^-$, $Br^-$ and $I^-$.

m may be 2, 4, or 6, and n may be an integer from 1 to 7.

In the exemplary embodiment of the present invention, the metal salt of the second metal may be specifically $Pt(NH_3)_4 (NO_3)_2$, $Pd(NH_3)_4 (NO_3)_2$, $Au(NH_3)_4 (NO_3)_2$, $Pt(NH_3)_4Cl_2$, $Pd(NH_3)_4Cl_2$, $Au(NH_3)_4Cl_2$, $Pt(CH_3NH_2)_4 (NO_3)_2$, $Pd(CH_3NH_2)_4 (NO_3)_2$, $Au(CH_3NH_2)_4 (NO_3)_2$, $Pt(CH_3NH_2)_4Cl_2$, $Pd(CH_3NH_2)_4Cl_2$, $Au(CH_3NH_2)_4Cl_2$, $Pt(H_2O)_4 (NO_3)_2$, $Pd(H_2O)_4 (NO_3)_2$, $Au(H_2O)_4 (NO_3)_2$, $Pt(H_2O)_4Cl_2$, $Pd(H_2O)_4Cl_2$ or $Au(H_2O)_4Cl_2$. For example, in the case of $Pt(NH_3)_4(NO_3)_2$, the metal salt is ionized so as to be present in the form of $Pt(NH_3)^{2+}$, and thus may be easily bonded to the surface of the core carrying negative charges.

When the metal salt of the second metal is ionized into a negative ion complex, the complex carries negative charges and thus may not be bonded to the surface of the core carrying negative charges, thereby not forming a core-shell structure. For example, the metal salt may be $K_2PdCl_4$, $K_2PtCl_4$, $Na_2PtCl_4$, $K_2AuCl_4$ or $Na_2AuCl_4$ in some cases. In the case of $K_2PtCl_4$, the metal salt is ionized so as to be present in the form of $PtCl_4^-$, and thus carries negative charges, thereby not forming a core-shell structure.

In the exemplary embodiment of the present application, a molar ratio of the first metal to the second metal in the solution may be from 1:1 to 10:1.

When the mole number of the first metal is one time less than the mole number of the second metal, it may be difficult to form a core-shell structure due to an insufficient amount of the core, and thus one time or more the mole number of the second metal is preferred. When the mole number of the first metal exceeds ten times the mole number of the second metal, the shell may be so thick that the size of the core-shell particles may be excessively increased, and thus ten times less than the mole number of the second metal is preferred.

Subsequently, a reducing agent is added to the solution, and a shell including the second metal is formed on a surface of core particle including the first metal (S1030).

In this case, core-shell particles supported on the carrier having a two-layer structure may be formed.

According to the exemplary embodiment of the present invention, reaction is carried out for 5 minutes to 120 minutes, specifically 10 minutes to 1 hour, and more specifically 20 minutes to 40 minutes after the metal salt of the second metal is added to the solution, and then the reducing agent may be added thereto.

In the exemplary embodiment of the present invention, in the forming of the core-shell particles, the core-shell particles may be formed by reacting the reducing agent and the core particles with the metal salt of the second metal in the solution for a predetermined time, specifically from 5 minutes to 120 minutes, and more specifically from 20 minutes to 90 minutes.

In the exemplary embodiment of the present invention, the adding of the reducing agent and the forming of the core-shell particles may be performed at room temperature. Specifically, the forming of the core-shell particles may be performed at a temperature in a range from 4° C. to 35° C., and more specifically at 15° C. to 28° C. The fabrication method may form core-shell particles exhibiting physical properties equal to or greater than those when core-shell particles are formed by reducing a metal acetylacetonate-series or metal carbonyl-series precursor, which carries out a reduction reaction at high temperature. That is, core-shell particles may be formed under milder conditions, and thus the method according to the exemplary embodiment of the present invention is more advantageous than the existing methods from the economical viewpoint of the process.

In the exemplary embodiment of the present invention, the reducing agent is not particularly limited as long as the reducing agent is a strong reducing agent having a standard reduction potential of −0.23 V or less, specifically from −4 V to −0.23 V, and has a reducing power which may reduce dissolved metal ions to be precipitated as metal particles.

Such a reducing agent may be at least one selected from the group consisting of, for example, $NaBH_4$, $NH_2NH_2$, $LiAlH_4$, and $LiBEt3H$.

When a weak reducing agent is used, it is difficult to achieve a continuous process in terms of a slow reaction rate, requirement for a subsequent heating of the solution, and the like, and thus mass production may be not feasible. In particular, in the case of using ethylene glycol that is a kind of weak reducing agent, there is a problem in that the productivity in a continuous process is low because a flow rate is decreased due to a high viscosity.

In the exemplary embodiment of the present invention, the second metal salt is reduced at a predetermined rate by the reducing agent, and then formed as a nano-sized shell including the second metal. Thus, the shell including the second metal may be formed on the surface of the aforementioned core particles including the first metal, thereby forming core-shell particles. The shell may be present in at least one region of an outer surface of the core particle, and may be present in the form of surrounding an entire surface of an outer surface of the core.

In the exemplary embodiment of the present invention, the core-shell particles may have an average particle diameter from 2 nm to 300 nm, specifically from 2 nm to 70 nm, and more specifically from 2 nm to 30 nm. In this case, the particle diameter of the core particles may be from 1 nm to 200 nm, specifically from 1 nm to 50 nm, and more specifically from 1 nm to 10 nm. In addition, the shell may have a thickness from 0.5 nm to 50 nm, specifically from 0.5 nm to 10 nm, and more specifically from 0.5 nm to nm. For example, when the second metal salt is $Pt(NH_3)_4(NO_3)_2$ including platinum (Pt), $Pd^{+2}$ is reduced to $Pd^0$ by sodium borohydride ($NaBH_4$), and a platinum (Pt)— containing shell having a thickness from 0.5 nm to 10 nm may be formed.

In the case of a core-shell structure, when the particle diameter of the core particles may be from 1 nm to 200 nm and the thickness of the shell covering the surface of the core particle may be from 0.5 nm to 50 nm, the particle diameter of the core-shell particle finally formed may be entirely from 2 nm to 300 nm. Specifically, when the particle diameter of the core particle may be from 1 nm to 50 nm and the thickness of the shell covering the surface of the core particle may be from 0.5 nm to 10 nm, the particle diameter of the core-shell particle finally formed may be entirely from 2 nm to 70 nm.

According to the exemplary embodiment of the present invention, it may be difficult to form core-shell particles having a particle diameter less than 2 nm, and when the particle diameter of the core-shell particle is 300 nm or less, there is a big advantage in that nano particles may be used in various fields. In the case where the particle diameter of the core-shell particle is 70 nm or less, when the core-shell particles formed are used as, for example, a catalyst of a fuel cell, the efficiency of the fuel cell may be significantly enhanced. Further, it is more preferred that the particle diameter of the core-shell particle is 30 nm or less.

The particle diameter of the plurality of core-shell particles formed in the exemplary embodiment of the present invention may be within a range from 80% to 120% of the average particle diameter of the core-shell particles. Specifically, the particle diameter of the core-shell particle may be within a range from 90% to 110% of the average particle diameter of the core-shell particles. When the particle diameter is out of the range, the size of the core-shell particle is entirely irregular, and thus it may be difficult to secure an intrinsic physical property value required by the core-shell particles. For example, when core-shell particles having a particle diameter out of a range from 80% to 120% of the average particle diameter of the core-shell particles are used as a catalyst of a fuel cell, the effect of improving the efficiency of the fuel cell may be insufficient.

In the exemplary embodiment of the present invention, the core-shell particles supported on a carrier are formed, and then the second solution including the core-shell particles may be centrifuged in order to separate core-shell particles supported on a carrier included in the second solution. Only core-shell particles separated after the centrifugation are collected. The core-shell particles may be washed using water. If necessary, a process of sintering the core-shell particles may be additionally performed.

Another exemplary embodiment of the present invention provides core-shell particles supported on a carrier fabricated by the fabrication method.

The core-shell particles supported on a carrier may be core-shell particles in which core-shell particles including a core including a first metal and a shell including a second metal are supported on a carrier. The shell in the core-shell particles may be present in at least one region of an outer surface of the core, and may be present in the form of surrounding an entire surface of an outer surface of the core. The average particle diameter of the core-shell particles may be from 2 nm to 300 nm, specifically from 2 nm to 70 nm, and more specifically from 2 nm to 30 nm.

Yet another exemplary embodiment of the present specification provides a catalyst for a fuel cell including core-shell particles supported on a carrier fabricated by the fabrication method.

Still another exemplary embodiment of the present specification provides a fuel cell including the catalyst for a fuel cell.

Specifically, the catalyst for a fuel cell may be included in a fuel cell electrode.

The fuel cell may be composed of a cathode as an air electrode, an anode as a hydrogen electrode and an electrolyte membrane, and oxygen reduction reaction (ORR), which occurs in the cathode as an air electrode among them, may be a rate determining step (RDS) of the total fuel cell reactions.

According to the exemplary embodiment of the present specification, the catalyst for a fuel cell including the core-shell particles may be included in the cathode to decrease strong bonding force between anions of the core-shell particles and an intermediate reactant (OH) generated during oxygen reduction, thereby increasing the activity of the oxygen reduction reaction.

The Examples of the present application have been described with reference to the accompanying drawings, but the present application is not limited to the Examples and may be fabricated in various forms, and it will be understood by a person with ordinary skill in the art to which the present application pertains that the present application may be implemented in other specific forms without modifying the technical spirit or essential feature of the present application. Therefore, it is to be appreciated that Examples described above are intended to be illustrative in every sense, and not restrictive.

Example 1

60 mg of carbon black (Vulcan XC 72), as a first metal salt, in which Ni particles having a size from 5 nm to 10 nm were supported was added to and dispersed in 10 ml of water (distilled water) as a solvent to form a solution. Thereafter, the pH of the solution was adjusted to 11 by adding dropwise 0.3 ml of 1 M NaOH thereto, 50 mg of $Pt(NH_3)_4(NO_3)_2$ as a Pt precursor, which was dissolved in distilled water, was added to the solution, and the resulting solution was stirred at room temperature for 30 minutes. The molar ratio of nickel (Ni) to platinum (Pt) measured at that time was 3:1. Core-shell particles composed of a core including nickel (Ni) and a shell including platinum (Pt) were formed by adding 60 mg of $NaBH_4$ as a reducing agent thereto while stirring the solution and reacting the resulting solution for 1 hour. Subsequently, after the core-shell particles were centrifuged at 10,000 rpm for 10 minutes, the supernatant in the upper layer thereof was discarded, the remaining precipitate was re-dispersed in 20 ml of water, and then the centrifugation process was repeated two times more to separate and wash the core-shell particles.

FIG. 2 illustrates a structure analysis image of the Ni—Pt particles on the core-shell particles using HR-TEM. FIG. 3 illustrates a result of analyzing the content of elements positioned along the arrow line in the image of FIG. 2. It can be confirmed that the intensity of Pt in the shell was high.

The particle diameter of the core-shell particles obtained from the HR-TEM of FIG. 3 was approximately 15 nm. The particle diameter of the core-shell particles formed was measured on 200 or more core-shell particles using a graphic software (MAC-View) based on FIG. 2, the average particle diameter was 15 nm through a statistical distribution obtained, and the difference of the particle diameters to the average particle diameter was calculated within ±7.8%.

FIG. 4 illustrates a core point indicated as P1 and a shell point indicated as P2 in the HR-TEM image of the core-shell particles fabricated according to Example 1. Tables 1 and 2 in FIG. 9 show the energy dispersive x-ray spectroscopy (EDS) analysis results of point P1 in the image of FIG. 4 and the P2 point in the image of FIG. 4, respectively.

In Table 1, since P1 is a core point, it can be confirmed that the content of Ni is high. In Table 2, since P2 is a shell point, it can be confirmed that the content of Pt is high.

Example 2

Core-shell particles composed of a core including nickel (Ni) and a shell including palladium (Pd) were formed in the same manner as in Example 1, except that $Pd(NH_3)_4(NO_3)_2$ was used as the second metal salt. The average particle diameter of the core-shell particles formed by Example 2 was 12 nm, and the difference of the particle diameters to the average particle diameter was calculated within ±8.7%.

Comparative Example 1

60 mg of carbon black (Vulcan XC 72), as a first metal salt, in which Ni particles having a size from 5 nm to 20 nm were supported was added to and dispersed in 10 ml of water (distilled water) as a solvent to form a solution. Thereafter, the pH of the solution was adjusted to 3 by adding dropwise 0.3 ml of 1 M HCl thereto, 50 mg of $Pt(NH_3)_4(NO_3)_2$ as a Pt precursor, which was dissolved in distilled water, was added to the solution, and the resulting solution was stirred at room temperature for 30 minutes. The molar ratio of Ni to Pt measured at that time was 3:1. 60 mg of NaBH4 as a reducing agent was added thereto under stirring, and the resulting solution was allowed to react at room temperature for 1 hour. Subsequently, after the solution was centrifuged at 10,000 rpm for 10 minutes, the supernatant in the upper layer thereof was discarded, the remaining precipitate was re-dispersed in 20 ml of water, and then the centrifugation process was repeated two times more.

FIG. 5 illustrates a structural analysis image of the product using a transmission electron microscope (TEM). It can be confirmed that it was difficult to observe the particle form. FIG. 6 illustrates an element analysis result of a point indicated as Spectrum 1 in the image of FIG. 5, which was measured by an element analysis device (Hitachi, S-4800).

Comparative Example 2

The same method as in Comparative Example 1 was used, except that $K_2PtCl_4$ was used as a Pt precursor instead of $Pt(NH_3)_4(NO_3)_2$.

FIG. 7 illustrates a structural analysis image of the product using a transmission electron microscope (TEM). In this case, it can be seen that only Pt particles not core-shell particles were observed. FIG. 8 illustrates an element analysis result of a point indicated as Spectrum 2 in the image of FIG. 7, which was measured by an element analysis device (Hitachi, S-4800).

Comparative Example 3

The same method as in Example 1 was used, except that the molar ratio of Ni to Pt was adjusted to be 12:1. As a result, it can be confirmed that the Pt shell failed to completely surround the Ni core, or form a shell.

Application Example

The core-shell particles fabricated in the present invention were applied to an electrode catalyst for a fuel cell air electrode. The fuel cell catalyst evaluation was conducted in a half cell system. As the electrode, a 3-electrode system, that is, a reference electrode, a counter electrode, and a working electrode, was used, the reference electrode was Ag/AgCl, and a 0.5 M sulfuric acid solution or a 0.1 M perchloric acid solution was used as an electrolyte.

In order to clean the surface of the catalyst, the surface was scanned from 15 times to 20 times at −0.2 V to 1.0 V and a scan rate of 20 mV/s using cyclic voltammetry.

A catalyst ink was prepared by mixing 2 mg of the catalyst, 8 μl of 5% nafion, 1.6 ml of EtOH, and 0.4 ml of $H_2O$, and dispersing the mixture for 1 hour using an ultrasonic cleaner, and then 20 μl of the catalyst ink was coated on an RDE electrode and dried. The amount of the catalyst coated on the electrode was about 20 μg. The area of the electrode was 0.196 $cm^2$.

The 0.1 M perchloric acid solution was bubbled with pure oxygen for 30 minutes, and then circulated from the negative direction to the positive direction from 0.9 V to 0.4 V with reference to a normal hydrogen electrode (NHE), and the scan rate was 20 mV/s and the rotating rate of the electrode was from 1,600 to 2,500 RPM.

As the catalyst, a 45 wt % and 19.3 wt % Pt/C commercially available catalyst and the Pd@Au@PdPt/C prepared in the present specification were used. The following Table 3 shows a component ratio of the catalyst fabricated. The component ratio analysis was performed using ICP equipment.

TABLE 3

|  |  | Pt | Ni |
|---|---|---|---|
| Ni@Pt/C_1 | Atomic ratio | 0.2 | 0.8 |
|  | Wt % | 8.6 | 10.2 |
| Ni@Pt/C_2 | Atomic ratio | 0.34 | 0.66 |
|  | Wt % | 19.2 | 11.2 |
| Ni@Pt/C_3 | Atomic ratio | 0.58 | 0.42 |
|  | Wt % | 27.4 | 11.4 |

The following Table 4 shows an activity result of an oxygen reduction reaction (ORR) at 0.8 V. Based on the Pt content, the activity per mass was 1.6 to 3.6 times higher, and based on the total metal content, a result equivalent thereto was obtained.

TABLE 4

| 0.8 V | 45% Pt/C | Ni@Pt/C_1 | Ni@Pt/C_2 | Ni@Pt/C_3 |
|---|---|---|---|---|
| Mass Activity (A/g Pt) | 15 | 37.1 | 43 | 33.7 |
| Mass Activity (A/g metal) | 15 | 17 | 27.2 | 23.8 |

From the aforementioned result, it can be confirmed that the core-shell particles of the present specification may be used as a fuel cell air electrode catalyst.

Although the specific part of the present application has been described in detail, it is obvious to those skilled in the art that such a specific description is just a preferred embodiment and the scope of the present application is not limited thereto. Thus, the substantial scope of the present application will be defined by the appended claims and equivalents thereto.

What is claimed is:

1. A method for fabricating core-shell particles supported on a carrier, the method comprising:

forming a solution by adding a first metal supported on a carrier to a solvent;

adjusting a pH of the solution from 10 to 12 and adding a metal salt of a second metal thereto; and forming core-shell particles by adding a reducing agent to the solution after the metal salt of a second metal has been added and forming a shell including the second metal on a surface of a core particle including the first metal;

wherein the metal salt of the second metal is represented by the following Formula 1:

$$XA_mB_n$$

in Formula 1,

X is different from the first metal, and is selected from the group consisting of platinum (Pt) and palladium (Pd), A is $(NH_3)$, $(CH_3NH_2)$ or $(H_2O)$, B is $NO_3-$, $NO_2-$ or $OH-$, m is 2, 4 or 6, and n is an integer from 1 to 7, and wherein throughout the method of fabricating core-shell particles the temperature of the solution is maintained between 4° C. and 35° C., the first metal is nickel (Ni), and wherein in the adding of the metal salt of the second metal to the solution, the metal salt of the second metal is added such that a molar ratio of the first metal to the second metal in the solution is from 1:1 to 10:1.

2. The method of claim 1, wherein the carrier is a carbon-based material or an inorganic fine particle.

3. The method of claim 1, wherein the solvent includes water.

4. The method of claim 1, wherein no surfactant is used in the method.

5. The method of claim 1, wherein the pH of the solution is adjusted by adding a base solution.

6. The method of claim 1, wherein the reducing agent has a standard reduction potential of −0.23 V or less.

7. The method of claim 1, wherein the core-shell particles have an average particle diameter from 2 nm to 300 nm.

8. The method of claim 1, wherein a particle diameter of the core is from 1 nm to 200 nm and a thickness of the shell is from 0.5 nm to 50 nm.

* * * * *